United States Patent
Datta et al.

(10) Patent No.: US 12,507,969 B2
(45) Date of Patent: Dec. 30, 2025

(54) SYSTEM AND METHOD FOR A BUILT-IN ALIGNMENT MECHANISM FOR AN X-RAY FOCAL SPOT

(71) Applicant: GE Precision Healthcare LLC, Waukesha, WI (US)

(72) Inventors: Arka Datta, Pewaukee, WI (US); John Moore Boudry, Waukesha, WI (US); Ryan James Lemminger, New Berlin, WI (US); Daniel Joseph Grieshop, Wauwatosa, WI (US); Roy-Arnulf Helge Nilsen, Waukesha, WI (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 328 days.

(21) Appl. No.: 18/354,267

(22) Filed: Jul. 18, 2023

(65) Prior Publication Data

US 2025/0025124 A1    Jan. 23, 2025

(51) Int. Cl.
A61B 6/40 (2024.01)
A61B 6/03 (2006.01)
A61B 6/58 (2024.01)

(52) U.S. Cl.
CPC ............ *A61B 6/4021* (2013.01); *A61B 6/032* (2013.01); *A61B 6/583* (2013.01)

(58) Field of Classification Search
None
See application file for complete search history.

(56) References Cited

U.S. PATENT DOCUMENTS

| | | | |
|---|---|---|---|
| 5,550,889 A | 8/1996 | Gard et al. | |
| 5,566,220 A * | 10/1996 | Saito | H05G 1/26 378/138 |
| 6,252,935 B1 | 6/2001 | Styrnol et al. | |
| 6,980,623 B2 * | 12/2005 | Dunham | A61B 6/583 378/19 |
| 7,507,026 B2 | 3/2009 | Andrews et al. | |
| 7,654,740 B2 | 2/2010 | Behling et al. | |
| 8,265,227 B2 | 9/2012 | Boudry et al. | |
| 9,417,194 B2 | 8/2016 | Wiedmann | |
| 9,549,712 B2 * | 1/2017 | Li | A61B 6/586 |
| 10,383,202 B2 * | 8/2019 | Canfield | A61B 6/035 |
| 10,383,203 B2 | 8/2019 | Meiler et al. | |
| 10,758,203 B2 * | 9/2020 | Tsuyuki | G01T 1/2985 |
| 11,039,809 B2 * | 6/2021 | Lemaitre | H05G 1/32 |
| 12,176,099 B2 * | 12/2024 | Datta | A61B 6/58 |
| 12,310,781 B2 * | 5/2025 | Li | A61B 6/585 |

(Continued)

*Primary Examiner* — Thomas R Artman
(74) *Attorney, Agent, or Firm* — Fletcher Yoder, P.C.

(57) ABSTRACT

A system and a method for maintaining an X-ray focal spot position at a desired location on an X-ray detector of an X-ray imaging system include obtaining, via processing circuitry, a scan protocol for performing an X-ray scan with the X-ray imaging system. The system and the method also include determining, via the processing circuitry, a bending magnet current value to utilize to maintain the X-ray focal spot position of an X-ray beam emitted from an X-ray tube of the X-ray imaging system at the desired location on the X-ray detector based on a plurality of acquisition parameters of the X-ray scan. The system and the method further include utilizing, via the processing circuitry, the bending magnet current value during the X-ray scan to maintain the X-ray focal spot position at the desired location on the X-ray detector.

12 Claims, 13 Drawing Sheets

(56) References Cited

U.S. PATENT DOCUMENTS

| | | | |
|---|---|---|---|
| 2005/0094762 A1* | 5/2005 | Dunham | A61B 6/4021 378/19 |
| 2008/0037713 A1* | 2/2008 | Andrews | H05G 1/025 378/196 |
| 2011/0150187 A1* | 6/2011 | Boudry | H05G 1/46 378/207 |
| 2015/0049857 A1* | 2/2015 | Wiedmann | A61B 6/032 378/19 |
| 2015/0117618 A1 | 4/2015 | Li et al. | |
| 2017/0318651 A1* | 11/2017 | Canfield | A61B 6/584 |
| 2017/0318652 A1* | 11/2017 | Meiler | A61B 6/4021 |
| 2019/0046151 A1* | 2/2019 | Tsuyuki | A61B 6/405 |
| 2019/0099149 A1* | 4/2019 | Li | A61B 6/4021 |
| 2023/0317264 A1* | 10/2023 | Datta | G16H 40/40 705/2 |
| 2023/0317398 A1* | 10/2023 | Boudry | G01N 23/046 378/137 |
| 2025/0025124 A1* | 1/2025 | Datta | A61B 6/585 |

\* cited by examiner

SYSTEM AND METHOD FOR A BUILT-IN ALIGNMENT MECHANISM FOR AN X-RAY FOCAL SPOT

BACKGROUND

The subject matter disclosed herein relates to medical imaging systems and, more particularly, to a system and a method for a built-in alignment mechanism for an X-ray focal spot.

In computed tomography (CT), X-ray radiation spans an object or a subject of interest being scanned, such as a human patient, baggage, or other object, and a portion of the radiation impacts a detector where the image data is collected. In digital X-ray systems a photodetector produces signals representative of the amount or intensity of radiation impacting discrete pixel regions of a detector surface. The signals may then be processed to generate an image that may be displayed for review. In the images produced by such systems, it may be possible to identify and examine the internal structures and organs within a subject's body. In CT imaging systems a detector array, including a series of detector elements or sensors, produces similar signals through various positions as a gantry is displaced around a subject or object being imaged, allowing volumetric image reconstructions to be obtained.

Reconstruction of images from the acquired data is generally based upon the assumption that X-ray photons have traveled in a straight path from an X-ray emission focal spot to the detector element at which the respective photon is detected. However, movement of the X-ray focal spot (e.g., X-ray focal spot drift) with respect to one or more collimating elements or plates (e.g., a post-patient anti-scatter grid) may result in image artifacts that are detrimental to clinical use of imaging systems, such as CT imaging systems. In addition, this X-ray focal spot drift may affect the accuracy of dose prediction. A number of acquisition parameters (e.g., tube current (milliamperes (mA), tube voltage (kilovolts (kV)), focal spot size (of electron beam impacting anode), rotation speed, thermal state, etc.) may cause X-ray focal spot drift.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a method for maintaining an X-ray focal spot position at a desired location on an X-ray detector of an X-ray imaging system is provided. The method includes obtaining, via processing circuitry, a scan protocol for performing an X-ray scan with the X-ray imaging system. The method also includes determining, via the processing circuitry, a bending magnet current value to utilize to maintain the X-ray focal spot position of an X-ray beam emitted from an X-ray tube of the X-ray imaging system at the desired location on the X-ray detector based on a plurality of acquisition parameters of the X-ray scan. The method further includes utilizing, via the processing circuitry, the bending magnet current value during the X-ray scan to maintain the X-ray focal spot position at the desired location on the X-ray detector.

In another embodiment, a system for maintaining an X-ray focal spot position at a desired location on an X-ray detector of an X-ray imaging system is provided. The system includes a memory encoding processor-executable routines. The system also includes processing circuitry configured to access the memory and to execute the processor-executable routines, wherein the routines, when executed by the processing circuitry, cause the processing circuitry to perform actions. The actions include obtaining a scan protocol for performing an X-ray scan with the X-ray imaging system. The actions also include determining a bending magnet current value to utilize to maintain the X-ray focal spot position of an X-ray beam emitted from an X-ray tube of the X-ray imaging system at the desired location on the X-ray detector based on a plurality of acquisition parameters of the X-ray scan. The actions further include utilizing the bending magnet current value during the X-ray scan to maintain the X-ray focal spot position at the desired location on the X-ray detector.

In a further embodiment, a non-transitory computer-readable medium, the computer-readable medium including processor-executable code that when executed by processing circuitry, causes the processing circuitry to perform actions. The actions include obtaining a scan protocol for performing a scan with a computed tomography (CT) imaging system. The actions also include determining from a functional map a bending magnet current value to utilize to maintain an X-ray focal spot position of an X-ray beam emitted from an X-ray tube of the CT imaging system at the desired location on an X-ray detector of the CT imaging system based on a plurality of acquisition parameters of the scan, wherein the functional map comprises a plurality of bending magnet current values and corresponding X-ray focal spot positions to be utilized for the plurality of acquisition parameters. The actions further include utilizing the bending magnet current value during the scan to maintain the X-ray focal spot position at the desired location on the X-ray detector.

BRIEF DESCRIPTION OF THE DRAWINGS

These and other features, aspects, and advantages of the present disclosed subject matter will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While aspects of the following discussion may be provided in the context of medical imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as tomographic image reconstruction for industrial Computed Tomography (CT) used in non-destructive inspection of manufactured parts or goods (i.e., quality control or quality review applications), and/or the non-invasive inspection of packages, boxes, luggage, and so forth (i.e., security or screening applications). In general, the present approaches may be useful in any imaging or screening context to provide reconstructed images without artifacts due to X-ray focal spot drift.

Figure 1:
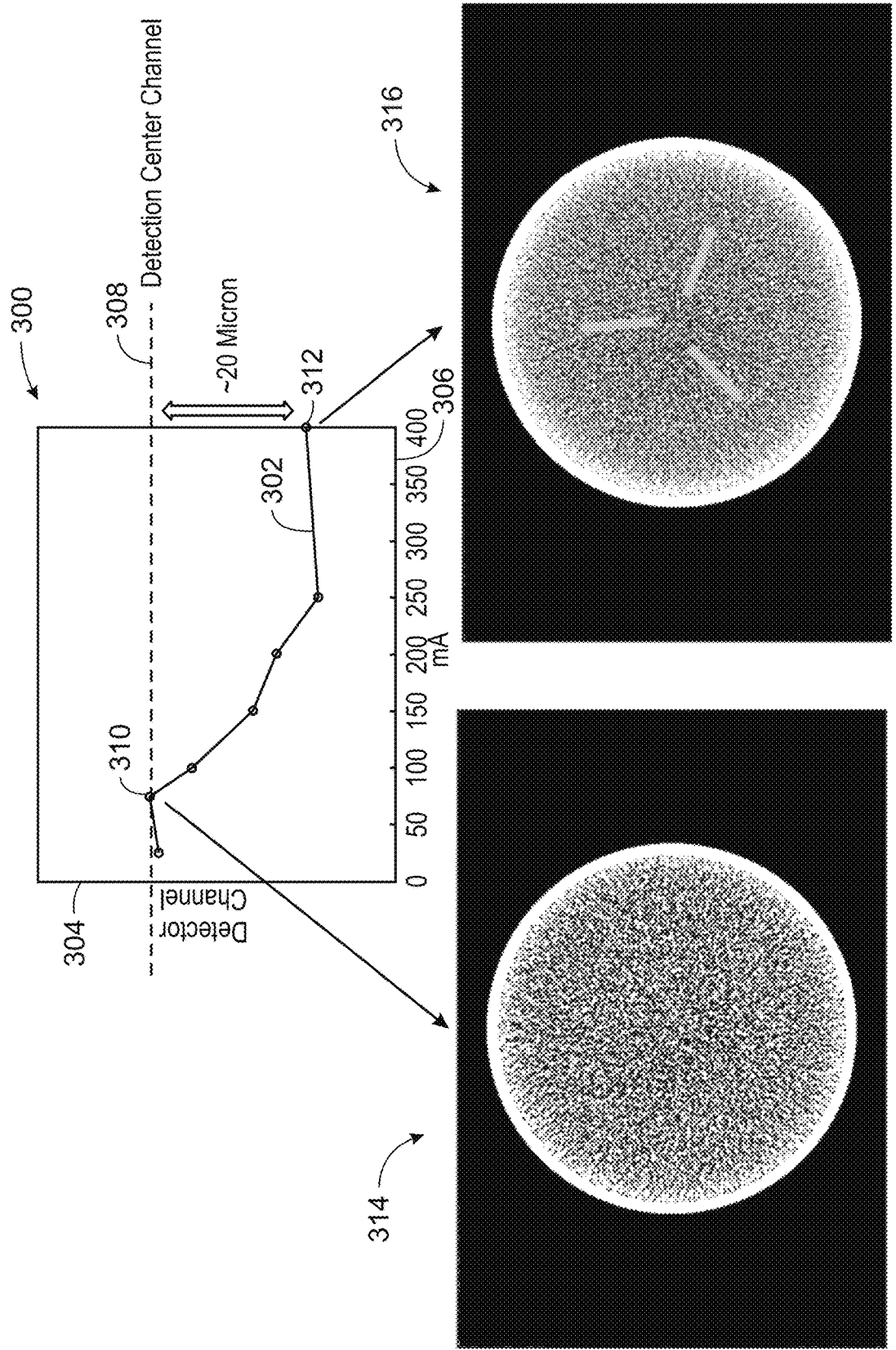
FIG. 1 is a schematic diagram of an impact of X-ray tube current (mA) on X-ray focal spot drift.

Movement of an X-ray focal spot (e.g., X-ray focal spot drift) with respect to one or more collimating elements or plates (e.g., a post-patient anti-scatter grid) may result in image artifacts that are detrimental to clinical use of imaging systems, such as CT imaging systems. In addition, this X-ray focal spot drift may affect the accuracy of dose prediction. A number of acquisition parameters (e.g., tube current (milliamperes (mA), (kilovolts (kV)), focal spot size (of electron beam impacting anode), rotation speed, thermal state, etc.) may cause X-ray focal spot drift. FIG. 1 is a schematic diagram of an impact of X-ray tube current (mA) on X-ray focal spot drift.

Figure 2:
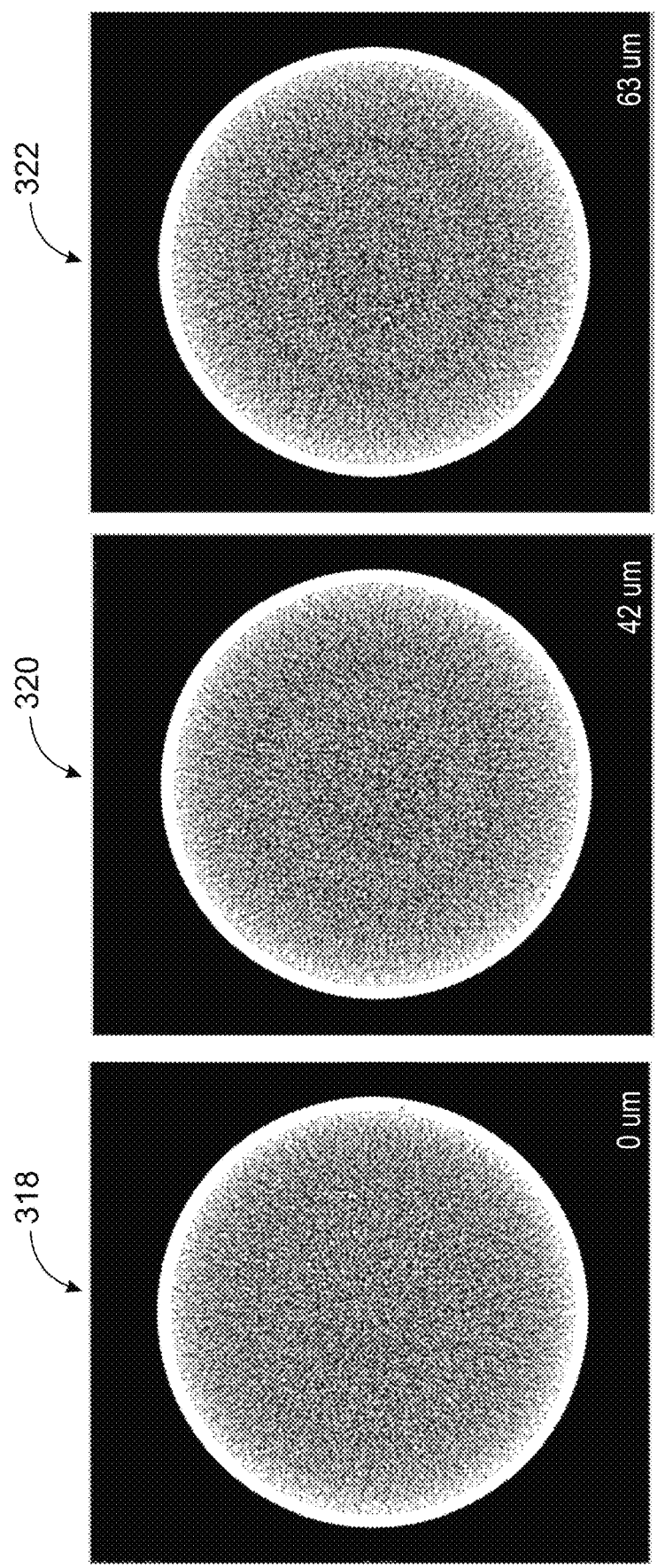
FIG. 2 is a schematic diagram of an impact of a thermal state on X-ray focal spot drift.

FIGS. 1 and 2 provide examples of acquisition parameters causing X-ray focal spot drift. FIG. 1 includes a graph 300 having a plot 302 depicting a detector channel of an X-ray detector of an X-ray imaging system (e.g., CT imaging system) where an X-ray focal spot is located relative to the tube current applied to an X-ray tube of the X-ray imaging system. A Y-axis (represented by reference numeral 304) of the graph 300 represents the detector channel. An X-axis (represented by reference numeral 306) of the graph 300 represents the tube current (in mA). Dashed line 308 represents a detector center channel of the X-ray detector. Point 310 of the plot 302 represents an X-ray focal spot location located at the detector center channel 308 (e.g., at approximately 75 mA). Point 312 of the plot 302 represents an X-ray focal spot location located away from the detector center channel 308 (e.g., approximately 20 microns from the detector center channel 308 and at approximately 400 mA). Image 314 in FIG. 1 is an image of an object (e.g., phantom) obtained via a scan (e.g., CT scan) with a tube current of approximately 75 mA when the X-ray focal spot is located at the detector center channel 308. Image 316 in FIG. 1 is an image of the same object obtained via a scan (e.g., CT scan) with a tube current of approximately 400 mA when the X-ray focal spot is located approximately 20 microns away from the detector center channel 308. As depicted in the graph 300, X-ray focal spot drift is dependent on the tube current. In addition, as depicted in the images 314 and 316, the X-ray focal spot drift causes artifacts in the image 316.

FIG. 2 is a schematic diagram of an impact of a thermal state on X-ray focal spot drift. FIG. 2 includes images 318, 320, and 322 acquired of an object (e.g., phantom) at different thermal states of the X-ray tube of an X-ray imaging system (e.g., CT imaging system) during a scan (e.g., CT scan). Image 318 is associated with a lower temperature. Image 322 is associated with the highest temperature. Image 320 is associated with a temperature between the temperatures associated with the images 318 and 322. Images 318, 320, and 322 are associated with X-ray focal spot drift of 0 microns, 42 microns, and 64 microns, respectively. As depicted in the images 318, 320, and 322, as the thermal state changes (i.e., temperature increases), the X-ray focal spot drift increases. Also, as depicted in the images 318, 320, and 322, the X-ray focal spot drift causes artifacts in the images 320 and 322. As depicted by FIG. 2, X-ray focal drift is dependent on the thermal state of the X-ray tube.

The present disclosure provides systems and methods for maintaining an X-ray focal spot position at a desired location (e.g., center detector channel location) on an X-ray detector of an X-ray imaging system (e.g., CT imaging system) over different system operating conditions via an in-built alignment mechanism for X-ray focal spot. In particular, the disclosed techniques include obtaining a scan protocol (e.g., calibration scan protocol or diagnostic scan protocol) for performing an X-ray scan (e.g., calibration scan or diagnostic CT scan) with the X-ray imaging system (e.g., CT imaging system). The disclosed techniques also include determining a bending magnet current value to utilize to maintain the X-ray focal spot position of an X-ray beam emitted from an X-ray tube of the X-ray imaging system at the desired location on the X-ray detector based on a plurality of acquisition parameters (or system operation parameters) (e.g., a tube current, a tube voltage, a focal spot size, a bowtie filter, a rotation speed, a gantry angle, a thermal state, a time of day, etc.) of the X-ray scan. The disclosed techniques further include utilizing the bending magnet current value during the X-ray scan to maintain the X-ray focal spot position at the desired location on the X-ray detector. The bending magnet current value during the X-ray scan may be applied to electromagnets that utilize electromagnetic deflection on an electron beam emitted from a cathode of the X-ray tube to maintain the X-ray focal spot position at the desired location on the X-ray detector.

In certain embodiments, prior to the X-ray scan, a functional map (or function look-up table) may have previously been generated that correlates bending magnet current values and X-ray focal spot position. The functional map includes a plurality of bending current values and corresponding X-ray focal spot positions to be utilized for the plurality of acquisition parameters. In certain embodiments, prior to the X-ray scan, the functional map be accessed (e.g., from among a plurality of functional maps) and the functional map be utilized in determining the bending magnet current value based on the plurality of acquisition parameters of the X-ray scan. The access and utilization of the functional map serves as in-built alignment mechanism for the X-ray focal spot as the functional map may be stored locally with the X-ray imaging system for utilization with the X-ray tube.

The functional map be generated after initial system staging of X-ray imaging system. In certain embodiments, the functional map be regenerated or updated after hardware replacement or planned maintenance cycles. The functional map may be generated by obtaining air scan data and edge scan data utilizing an initial bending magnet current value and initial acquisition parameters during an initial scan with the X-ray imaging system, determining an initial X-ray focal spot position based on the air scan data and the edge scan data, obtaining additional air scan data and additional edge scan data at different bending magnet current values utilized with the same initial acquisition parameters during subsequent scans with the X-ray imaging system, and determining different focal spot positions based on the additional air scan data and the additional edge scan data (derived from utilizing the different bending magnet current values). This process may be repeated a number of times where at least one of the acquisition parameters is different to generate further functional maps or functional look-up tables.

The X-ray focal spot position utilized (e.g., maintained) during the X-ray scan is independent of the plurality of acquisition parameters (or system operating conditions). The disclosed techniques improve both calibration robustness and image quality (e.g., by mitigating artifacts caused by X-ray focal spot position drift) due to decoupling tube current (mA) dependency from X-ray focal spot position. The disclosed techniques also improve serviceability by ensuring a desired X-ray focal spot location over a detector after a hardware swap (e.g., of an X-ray tube or bowtie filter), thus, minimizing system downtime (e.g., by reducing calibration time). The disclosed techniques further improve dose delivery predictability by enforcing the assumption related to X-ray focal spot position (as a precise X-ray focal spot location over a detector is required to calculate and estimate the accurate dose for a patient). The disclosed techniques provide a holistic approach combining system hardware along with software for computation and analysis to align X-ray focal position to a desired location of a detector (i.e., keeps the X-ray focal spot position consistent at a desired location on the detector across all acquisition parameters).

Figure 3:
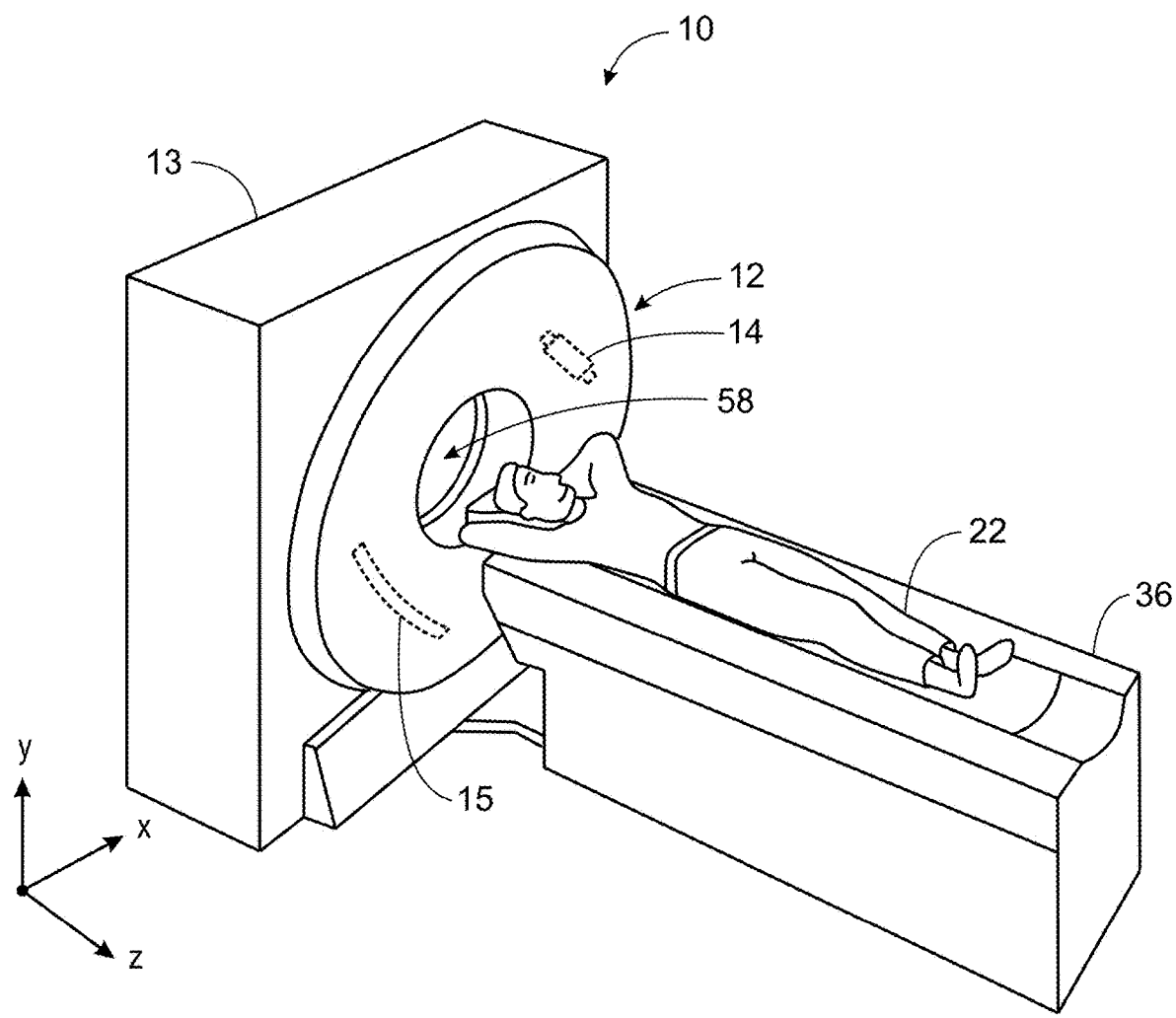
FIG. 3 is a pictorial representation of a CT imaging system, in accordance with aspects of the present disclosure.
Figure 4:
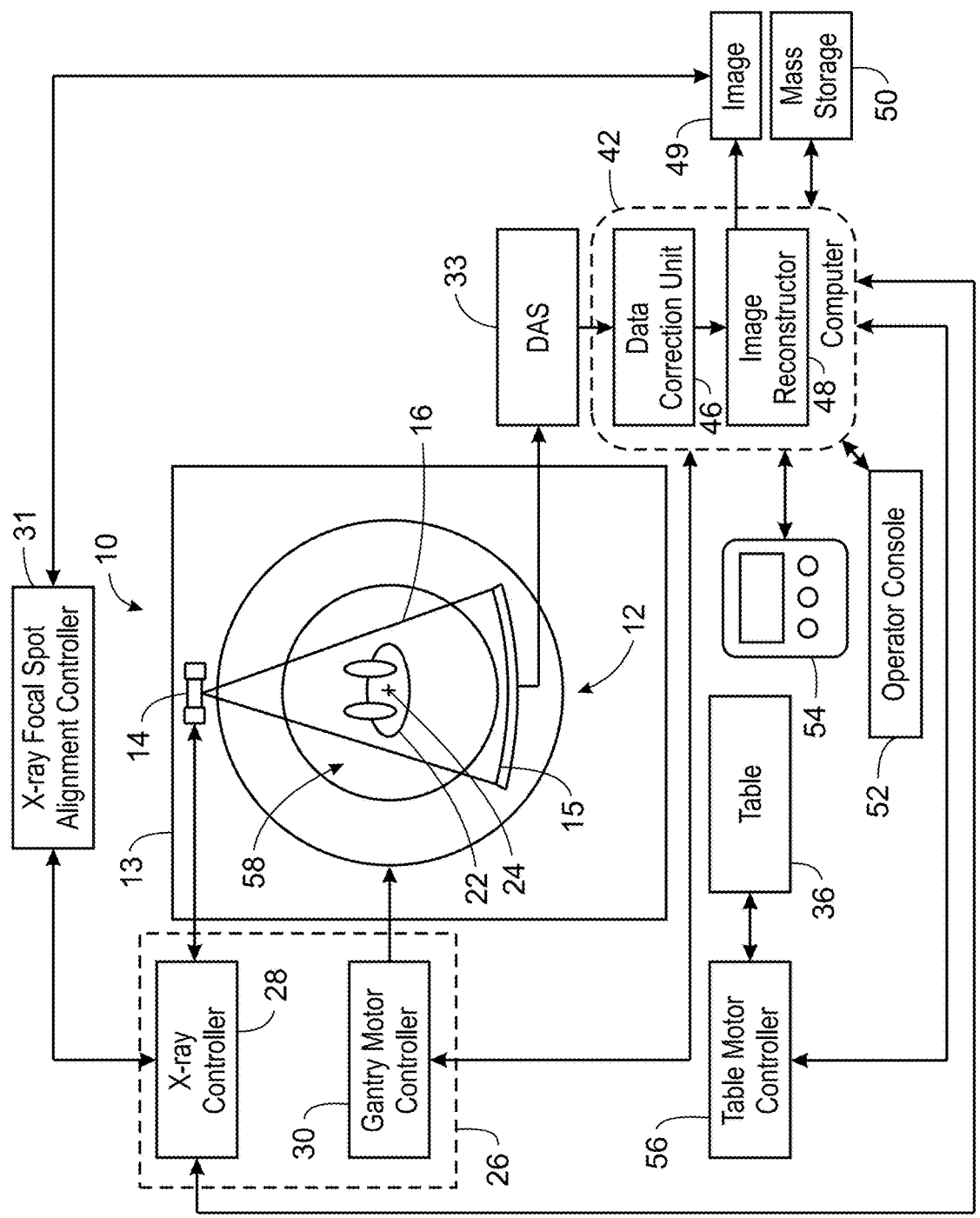
FIG. 4 is a block diagram of the CT imaging system in FIG. 1, in accordance with aspects of the present disclosure.

With the preceding in mind and referring to FIGS. 3 and 4, a CT imaging system 10 is shown, by way of example. The CT imaging system 10 of FIGS. 3 and 4 may be utilized with a dual-modality imaging system (e.g., positron emission tomography (PET)/CT imaging system). The CT imaging system 10 (e.g., CT scanner) includes a gantry 12 coupled having a housing 13 (e.g., gantry housing). The gantry 12 has a rotating component and a stationary component. The gantry 12 has an X-ray source or X-ray tube 14 that projects a beam of X-rays 16 toward an X-ray detector assembly or X-ray detector array 15 (e.g., having a plurality of detector modules) on the opposite side of the gantry 12. The X-ray source 14 and the X-ray detector assembly 15 are disposed on the rotating portion of the gantry 12. The X-ray detector assembly 15 is coupled to data acquisition systems (DAS) 33. The plurality of detector modules of the X-ray detector assembly 15 detect the projected X-rays that pass through a patient or subject 22, and DAS 33 converts the data to digital signals for subsequent processing. Each detector module of the X-ray detector assembly 15 in a conventional system produces an analog electrical signal that represents the intensity of an incident X-ray beam and hence the attenuated beam as it passes through the patient 22. During a scan to acquire X-ray projection data, gantry 12 and the components mounted thereon rotate about a center of rotation 24 (e.g., isocenter) so as to collect attenuation data from a multitude of view angles relative to the imaged volume.

Rotation of gantry 12 and the operation of X-ray source 14 are governed by a control mechanism 26 of CT system 10. Control mechanism 26 includes an X-ray controller 28 that provides power and timing signals to the X-ray source 14 and a gantry motor controller 30 that controls the rotational speed and position of gantry 12. An X-ray focal spot alignment controller 31 is communicatively coupled to the X-ray controller 28. The X-ray focal spot alignment controller 31 controls a location of an X-ray focal spot position of the beam of X-rays 16 on the X-ray detector assembly 15. In particular, the X-ray focal spot alignment controller 31 is configured to determine and to utilize a bending magnet current value (e.g., obtained from a functional table or functional look-up table) to maintain an X-ray focal spot position of the beam of X-rays 16 at a desired location (e.g., detector center channel) of the X-ray detector assembly 15. A bending magnet current corresponding to the determined bending magnet current value is applied to electromagnets to utilize electromagnetic deflection on an electron beam emitted from a cathode of the X-ray tube toward an anode to adjust the focal spot of the electron beam on the anode to achieve the desired location for the beam of X-rays 16 on the X-ray detector assembly 15.

A computer 42 (separate from or a part of the CT imaging system 10) includes a data correction unit 46 for processing or correcting the CT scan data from the DAS 33. The computer 42 also includes an image reconstructor 48. The image reconstructor 48 receives sampled and digitized X-ray data from DAS 33 and performs high-speed reconstruction. The reconstructed image 49 is applied as an input to the computer 42, which stores the image in a mass storage device 50. The reconstructed image 49 (i.e., air scan and edge scan data) is also utilized in conjunction with the X-ray focal spot alignment controller in generating a functional table or functional look-up table that may be stored in the mass storage 50 and utilized for determining a bending magnet current value to utilize to maintain the X-ray focal spot at a desired location on the X-ray detector assembly 15 during a scan across all acquisition parameters (or system operation conditions). The functional map correlates bending magnet current value and X-ray focal spot position. The functional map includes a plurality of bending currents to be utilized for a set of acquisition parameters utilized with the X-ray imaging system to achieve the desired location for an X-ray focal spot.

Computer 42 also receives commands and scanning parameters from an operator via console 52. An associated display 54 allows the operator to observe the reconstructed image 49 and other data from the computer 42. The operator supplied commands and parameters are used by computer 42 to provide control signals and information to the DAS 33, X-ray controller 28, gantry motor controller 30, and the X-ray focal spot alignment controller 31. In addition, computer 42 operates a table motor controller 56, which controls a motorized table 36 to position the patient 22 relative to the gantry 12. Particularly, table 36 moves portions of the patient 22 through a gantry opening or bore 58.

The computer 42 include includes processing circuitry. The processing circuitry may be one or more general or application-specific microprocessors. The processing circuitry may be configured to execute instructions stored in a memory to perform various actions. For example, the processing circuitry may be utilized for generating images from scan data (e.g., air scan data, edge scan data, diagnostic scan data, etc.). The processing circuitry may also be utilized to obtain a scan protocol (e.g., calibration scan protocol or diagnostic scan protocol) for performing an X-ray scan (e.g., calibration scan or diagnostic CT scan) with the X-ray imaging system (e.g., CT imaging system). The processing circuitry may also be utilized to determine a bending magnet current value to utilize to maintain the X-ray focal spot position of an X-ray beam emitted from an X-ray tube of the X-ray imaging system at the desired location on the X-ray detector based on a plurality of acquisition parameters (or system operation parameters) (e.g., a tube current, a tube voltage, a focal spot size, a bowtie filter, a rotation speed, a gantry angle, a thermal state, a time of day, etc.) of the X-ray scan. The processing circuitry may also be utilized to utilize the bending magnet current value during the X-ray scan to maintain the X-ray focal spot position at the desired location on the X-ray detector. A bending magnet current corresponding to the bending magnet current value during the X-ray scan may be applied to electromagnets that utilize electromagnetic deflection on an electron beam emitted from a cathode of the X-ray tube to maintain the X-ray focal spot position at the desired location on the X-ray detector.

Figure 5:
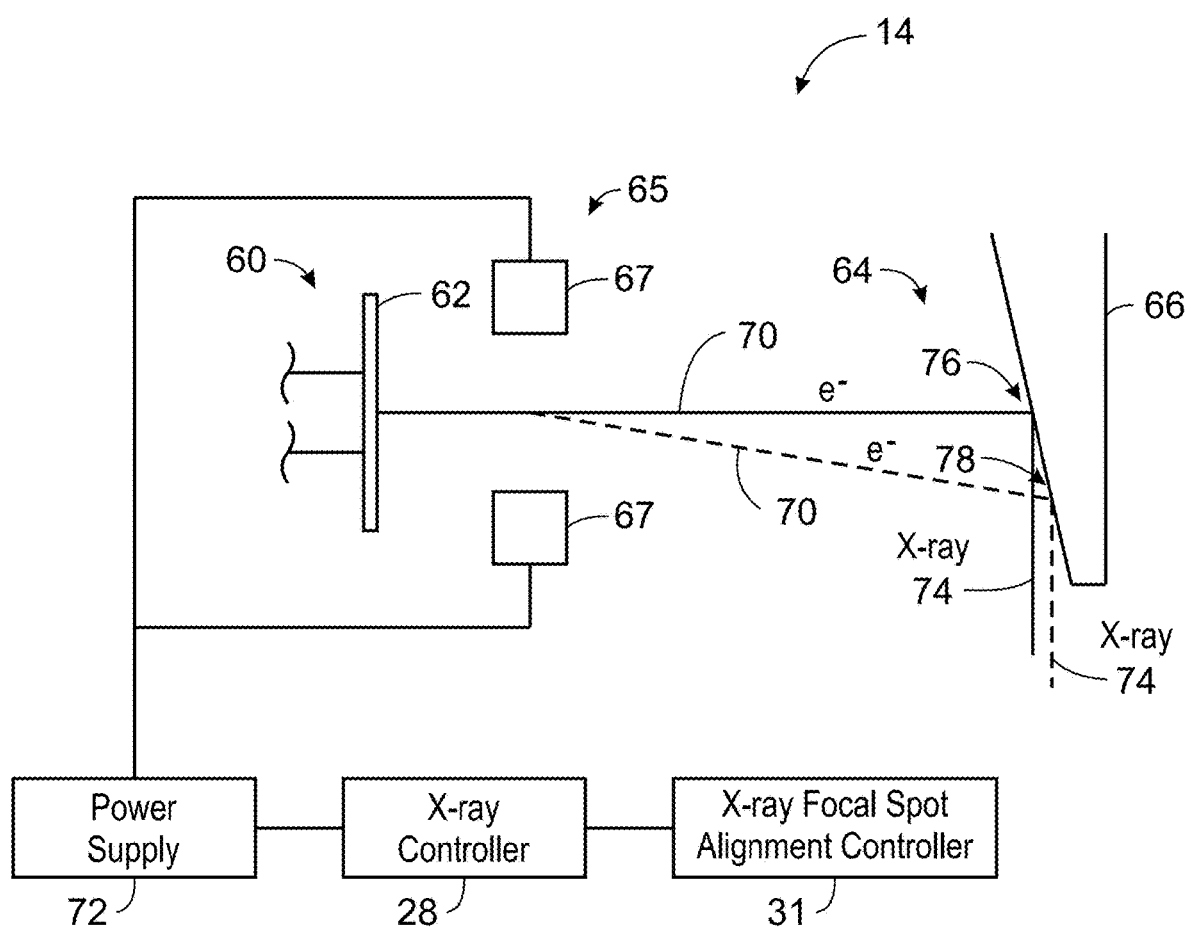
FIG. 5 is a schematic diagram of a portion of an X-ray tube illustrating steering of an electron beam, in accordance with aspects of the present disclosure.

FIG. 5 is a schematic diagram of a portion of the X-ray tube illustrating steering of an electron beam. The X-ray tube 14 includes an electron beam source 60 including a cathode 62 and an anode assembly 64 including an anode 66, and a beam steering system 65 (e.g., including electrode magnets or electromagnets 67). The cathode 62, anode 66, and the beam steering mechanism 65 may be disposed within an enclosure (not shown) such as a glass or metallic envelope. The X-ray tube 14 may be positioned within a casing (not shown) which may be made of aluminum and lined with lead. In certain embodiments, the anode assembly 64 may include a rotor and a stator (not shown) outside of the X-ray tube 14 at least partially surrounding the rotor for causing rotation of the anode 66 during operation.

The cathode 62 is configured to receive electrical signals via a series of electrical leads 68 (e.g., coupled to a high voltage source) that cause emission of an electron beam 70. The anode 66 is configured to receive the electron beam 70 on a target surface 72 and to emit X-rays (e.g., X-ray beam), as indicated by reference numeral 74, when impacted by the electron beam 70 as depicted in FIG. 5. The electrical signals may be timing/control signals (via a power supply 72 coupled to the X-ray controller 28 and the X-ray focal spot alignment controller 31) that cause the cathode 62 to emit the electron beam 70 at one or more energies. Further, the electrical signals may at least partially control the potential between the cathode 62 and the anode 66. The voltage difference between the cathode 62 and the anode 66 may range from tens of thousands of volts to in excess of hundreds of thousands of volts. The anode 66 is coupled to the rotor (not shown) via a shaft (not shown). Rotation of the anode 66 allows the electron beam 70 to constantly strike a different point on the anode perimeter. Within the enclosure of the X-ray tube 12, a vacuum of the order of 10-5 to about 10-9 torr at room temperature is preferably maintained to permit unperturbed transmission of the electron beam 70 between the cathode 62 and the anode 66.

The power supply 72 is also couple to the electromagnets 67 of the beam steering system 65. In response to control signals from the X-ray controller 28 and the X-ray focal spot controller, a bending magnet current from the power supply 72 may be applied to the electromagnets 67 to generate an electromagnetic field to steer the electron beam 70 between different focal spot positions (i.e., where the electron beam impacts the anode 66) such as depicted focal spot positions 76 and 78 which also alters the X-ray focal spot (i.e., location where the X-ray beam 74 impacts the detector). The generated electromagnetic field may also alter the size or shape of the focal spot.

Figure 6:
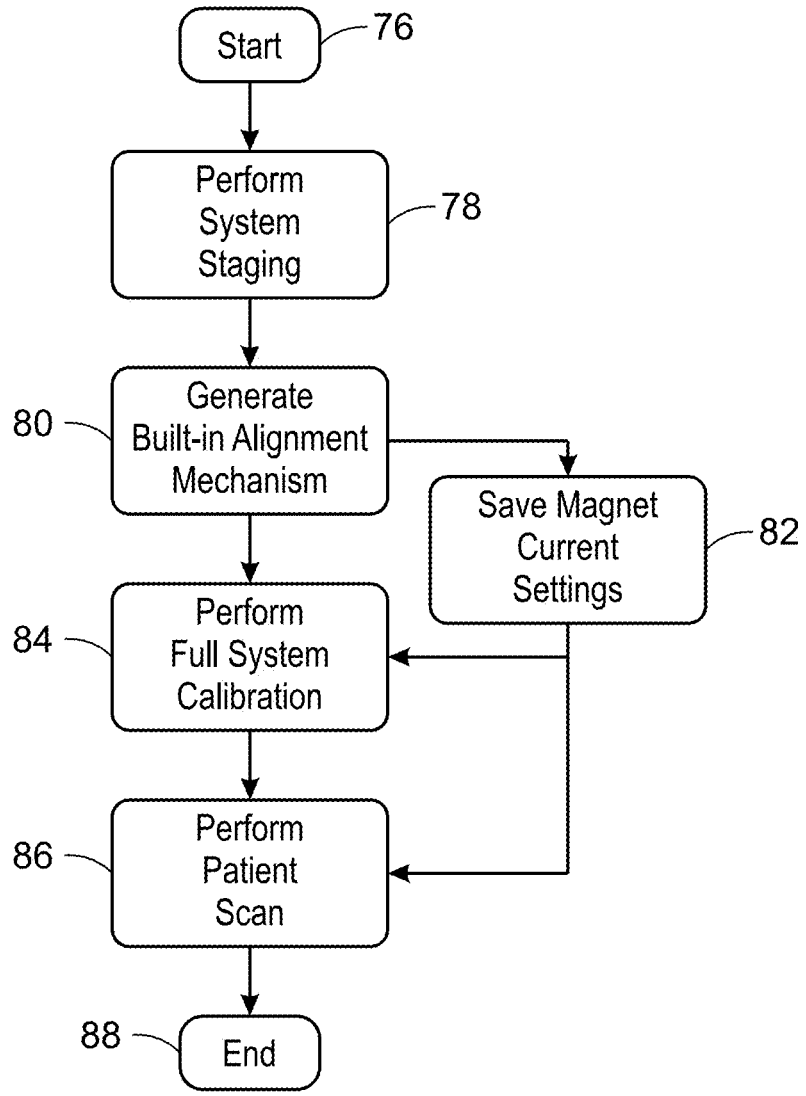
FIG. 6 is a process flow of steps for integrating a built-in alignment mechanism for X-ray focal spot, in accordance with aspects of the present disclosure.

FIG. 6 is a process flow of steps for integrating a built-in alignment mechanism for X-ray focal spot. The process flow starts at step 76. The process flow includes performing system staging for an X-ray imaging system (e.g., CT imaging system 10 in FIGS. 1 and 2) at step 78. System staging includes the initial setup of the X-ray imaging system at a location (e.g., unpacking of components, running of all cables, positioning of table and gantry, and mounting of components).

At step 80, the built-in alignment mechanism for X-ray focal spot is generated. In particular, air scan data and edge scan data are obtained utilizing an initial bending magnet current value and initial acquisition parameters during an initial scan with the X-ray imaging system. Then, an initial X-ray focal spot position is determined based on the air scan data and the edge scan data. This is followed by obtaining additional air scan data and additional edge scan data at different bending magnet current values utilized with the same initial acquisition parameters during subsequent scans with the X-ray imaging system and determining different focal spot positions based on the additional air scan data and the additional edge scan data. A functional map or functional look-up table is generated from these calculations that correlates bending magnet current value and X-ray focal spot position. The functional map includes a plurality of bending currents to be utilized for a set of acquisition parameters utilized with the X-ray imaging system to achieve the desired location for an X-ray focal spot. This process may be repeated a number of times where at least one of the acquisition parameters is different to generate further functional maps or functional look-up tables.

The functional map (or maps) including the bending magnet current values are saved at step 82 for utilization with a subsequent scan. For example, a bending current magnet from a functional map (based on the acquisition parameters for the calibration scan) may be utilized in a performing a full system calibration that maintains the X-ray focal spot at a desired location on the X-ray detector at step 84. The calibration scan may include scanning a phantom with known radiodensity to check whether its measurements (i.e., the CT imaging system) gives the appropriate number of Hounsfield Units (HUs). In another example, a patient scan (e.g., diagnostic scan of subject) may be performed utilizing a bending current magnet from a functional map (based on the acquisition parameters for the patient scan) that maintains the X-ray focal spot at a desired location on the X-ray detector at step 86. After a scan, the process flow ends at step 88.

Figure 7:
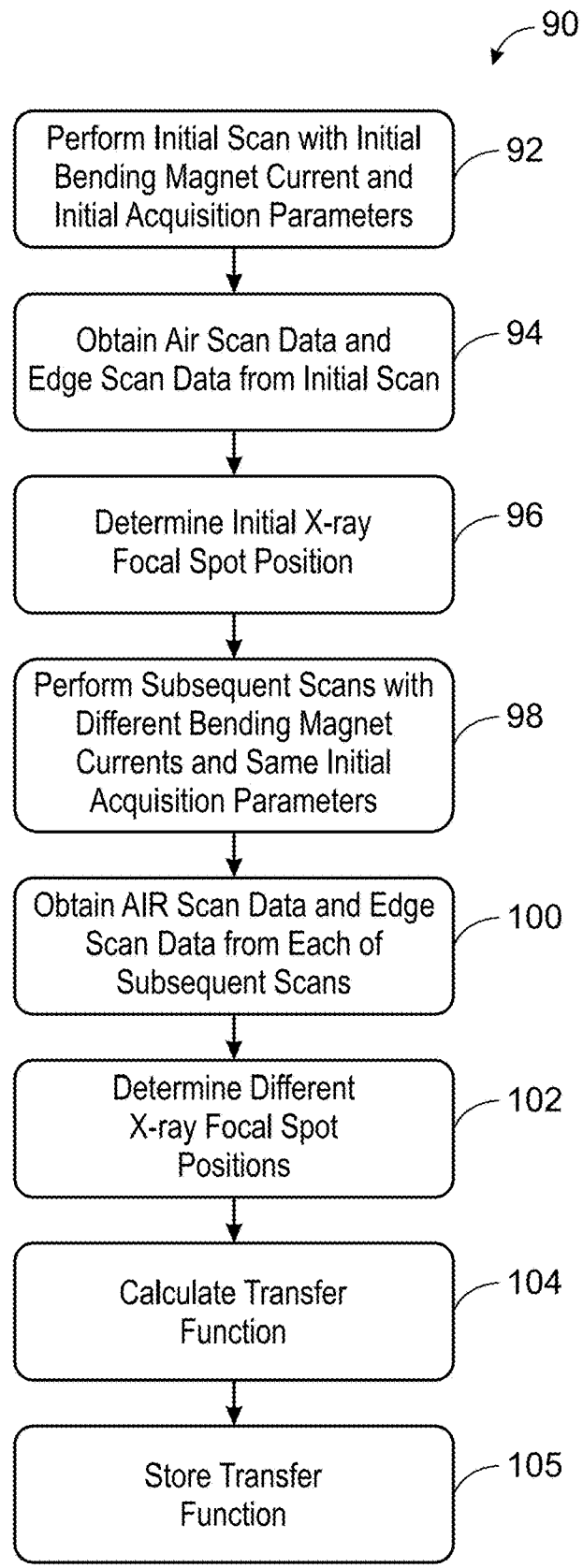
FIG. 7 is a flowchart of a method for generating a functional map or functional look-up table, in accordance with aspects of the present disclosure.

FIG. 7 is a flowchart of a method 90 for generating a functional map or functional look-up table. The method 90 may be performed by one or more components (e.g., processing circuitry) of the CT imaging system 10 in FIGS. 3 and 4. The method 90 may be performed after staging of the X-ray imaging system (e.g., CT imaging system). The method 90 may also be performed after swapping out hardware of the CT imaging system (e.g., bowtie filter, X-ray tube, etc.). The method 90 may also be performed after scheduled maintenance of the X-ray imaging system.

The method 90 includes performing an initial scan (e.g., air scan without a subject within the gantry) with the X-ray imaging system (e.g., CT imaging system) utilizing an initial bending magnet current value and initial acquisition parameters (e.g., tube current (mA), tube voltage (kV), focal spot size (of electron beam impacting anode), rotation speed, thermal state, etc.) (block 92). The method 90 also includes obtaining air scan data and edge scan data from the initial scan (block 94). The method 90 further includes determining an initial X-ray focal spot position (associated with initial bending magnet current value and relative to a center channel of the X-ray detector) based on the air scan data and the edge scan data (block 96). The method 90 yet further includes performing subsequent scans (e.g., air scans) with different bending magnet current values utilized with the same initial acquisition parameters (block 98). The method 90 even further includes obtaining additional air scan data and additional edge scan data from each of these subsequent scans utilizing these different bending magnet current values (block 100). The method 90 still further includes determining different X-ray focal spot positions (associated with the different bending magnet current values and relative to the center channel of the X-ray detector) based on the additional air scan data and the additional edge scan data (from these scans with the different bending magnet current values) (block 102). The method 90 yet further includes calculating or generating a transfer function (e.g., functional map or functional look-up table) from the previous calculations from the initial scan the subsequent scans (block 104). The method 90 still further includes storing the transfer function (e.g., locally with the X-ray imaging system) (block 105). This process may be repeated a number of times where at least one of the acquisition parameters is different to generate further functional maps or functional look-up tables.

Figure 8:
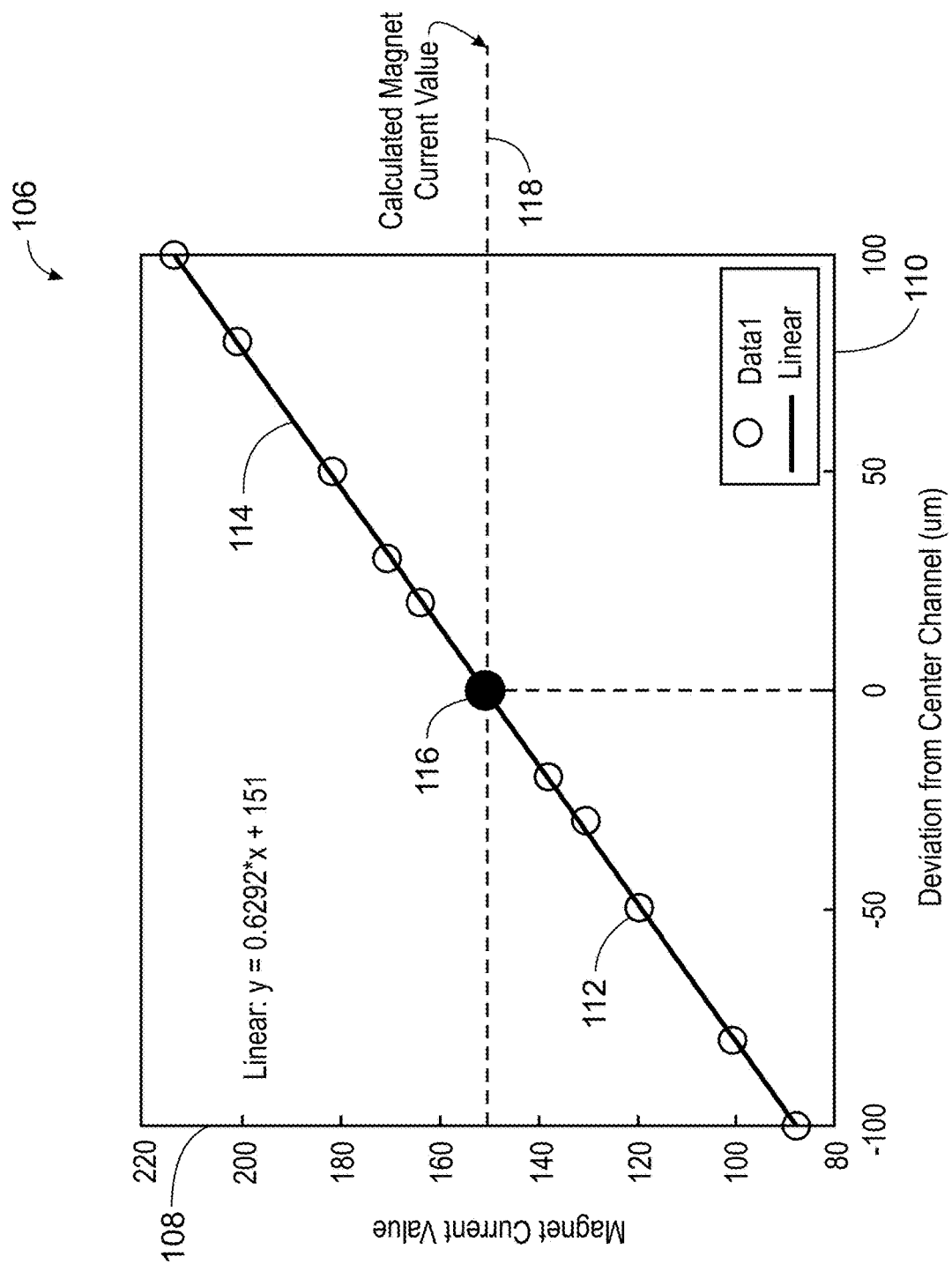
FIG. 8 is an example of a functional map, in accordance with aspects of the present disclosure.

FIG. 8 is an example of a functional map 106. The Y-axis 108 of the functional map 106 represents bending magnet current value. The X-axis 110 of the functional map 106 represents the X-ray focal spot positions (relative to a center channel of the X-ray detector). Points 112 represent data points obtained from the initial and subsequent scans (as described in the method 90 in FIG. 7). Plot 114 represents a linear function obtained from the points 112. Point 116 represents where the linear function 114 crosses a desired location (e.g., center location) of the X-ray detector in the functional map 106. Dashed line 118 represents a calculated bending magnet current value to obtain the desired X-ray focal spot position (e.g., center location) on the X-ray detector.

Figure 9:
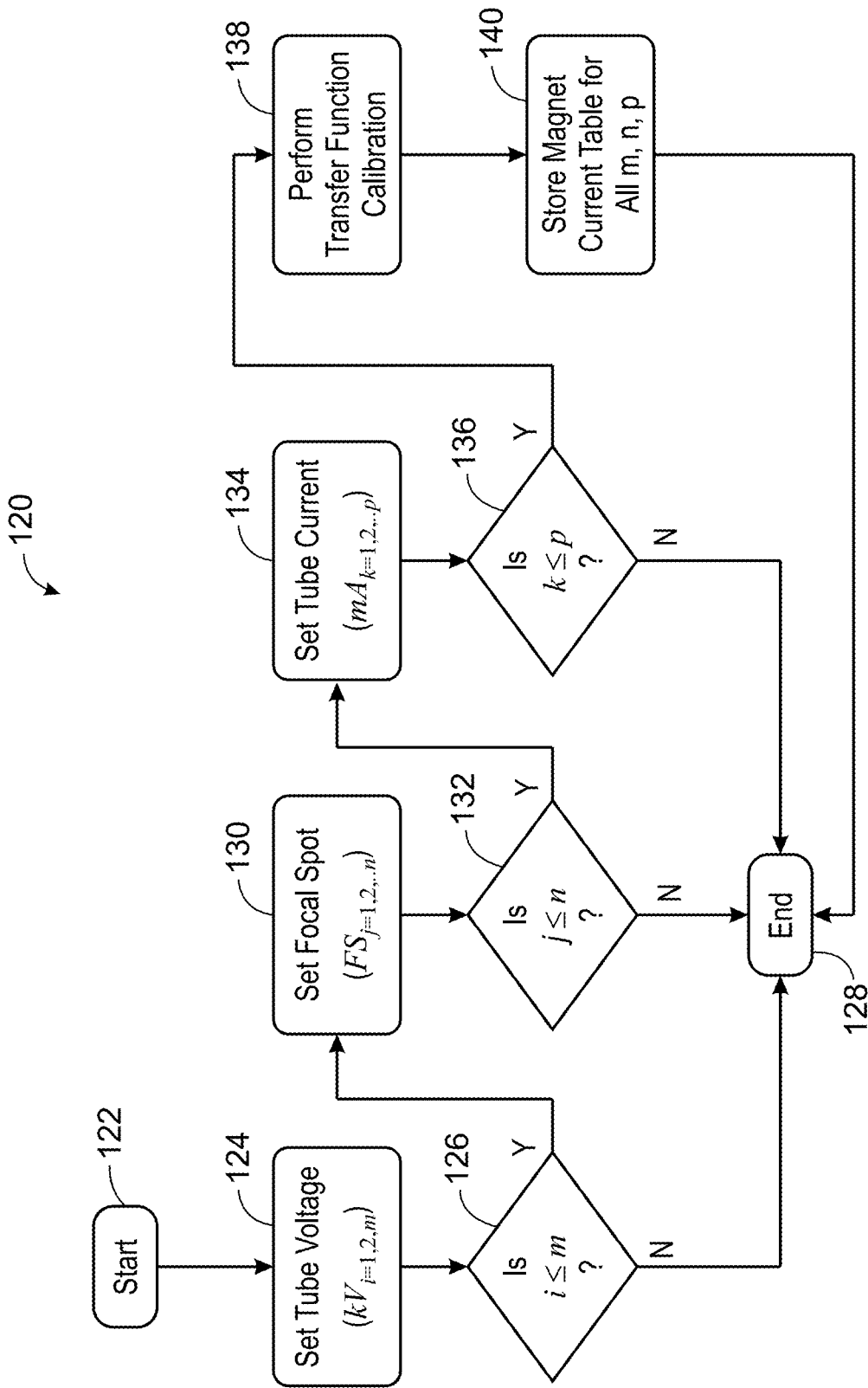
FIG. 9 is a flowchart of a method for generating a functional map or functional look-up table, in accordance with aspects of the present disclosure.

FIG. 9 is a flowchart of a method 120 for generating a functional map or functional look-up table. The method 120 is similar to the method 90 in FIG. 7 except with specific examples of acquisition parameters. The method 120 may be performed by one or more components (e.g., processing circuitry) of the CT imaging system 10 in FIGS. 3 and 4. The method 120 may be performed after staging of the X-ray imaging system (e.g., CT imaging system). The method 120 may also be performed after swapping out hardware of the CT imaging system (e.g., bowtie filter, X-ray tube, etc.). The method 120 may also be performed after scheduled maintenance of the X-ray imaging system. Although the method 120 depicts utilizing tube voltage, focal spot size, and tube current, one or more different or additional acquisition parameters (e.g., a bowtie filter, a rotation speed, a gantry angle, a thermal state, a time of day, etc.) may be utilized. Although the method 120 depicts utilizing three acquisition parameters, more than three acquisition parameters may be utilized.

Upon starting the method 120 (block 122), the method 120 includes setting the X-ray tube voltage (block 124). The method 120 also includes determining if the current value of the X-ray tube voltage, i, is less than or equal to a set upper value of the X-ray tube voltage, m (block 126). If the current value of the X-ray tube voltage is greater than the set upper value of the X-ray tube voltage, then the method 120 ends (block 128). If the current value of the X-ray tube voltage is less than or equal to the set upper value of the X-ray tube voltage, the method 120 includes setting the focal spot size (i.e., of the electron beam impacting the anode) (block 130). The method 120 also includes determining if the current value of focal spot size, j, is less than or equal to a set upper value of the focal spot size, n (block 132). If the current value of the focal spot size is greater than the set upper value of the focal spot size, then the method 120 ends (block 128). If the current value of the focal spot size is less than or equal to the set upper value of the focal spot size, the method 120 includes setting the X-ray tube current (block 134). The method 120 also includes determining if the current value of the X-ray tube current, k, is less than or equal to a set upper value of the X-ray tube current, p (block 136). If the current value of the X-ray tube current is greater than the set upper value of the X-ray tube current, then the method 120 ends (block 128).

The method 120 also includes performing a transfer function calculation (block 138). Performing the transfer function calculation includes performing scans (e.g., air scan) for a given (and same) setting (1, 2, etc.) of X-ray tube voltage, focal spot size, and X-ray tube voltage with a plurality of different bending magnet current values. Performing the transfer function calculation also includes determining respective X-ray focal spot positions on an X-ray detector for each scan of the respective scans for a given setting of X-ray tube voltage, focal spot size, and X-ray tube voltage (e.g., based on respective air scan data and edge scan data from the respective scan). Performing the transfer function calculation further includes generating a functional map based on the calculations obtained from the scans for a given setting of X-ray tube voltage, focal spot size, and X-ray tube voltage. The transfer function calculation (block 138) is performed for each respective setting of X-ray tube voltage, focal spot size, and X-ray tube voltage. The method 120 further includes storing a magnet current table (e.g., based on the transfer functions) for all settings of X-ray tube voltage, focal spot size, and X-ray tube voltage (block 140). Upon storing the magnet current table, the method 120 ends (block 128).

Figure 10:
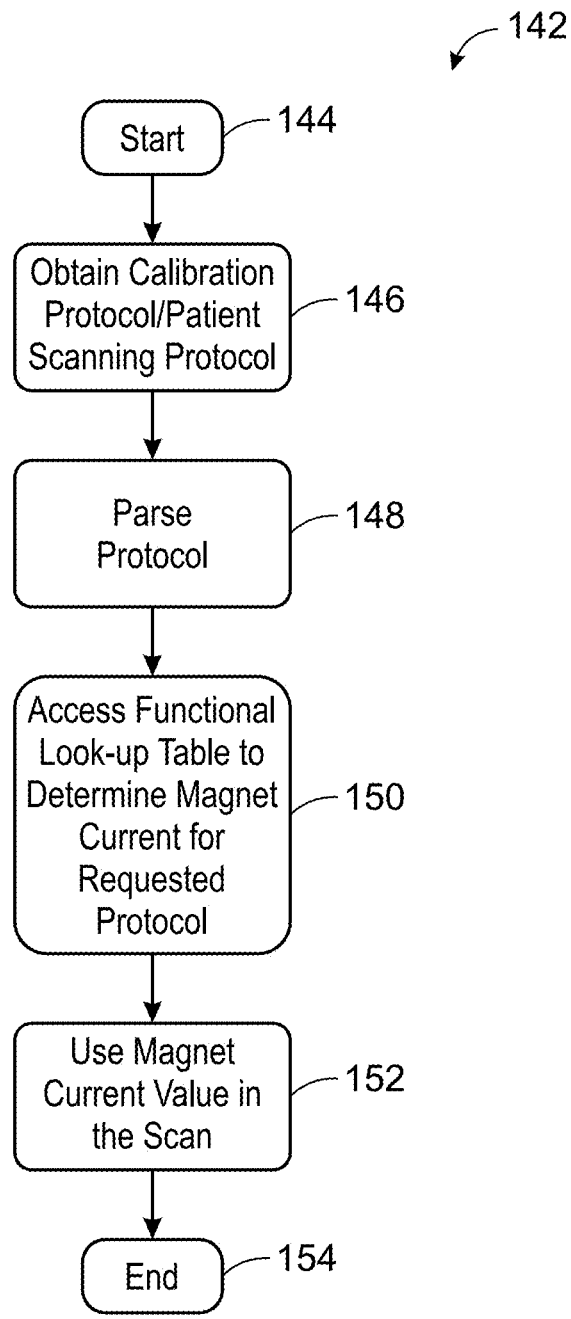
FIG. 10 is a flowchart of a method for utilizing a transfer function during a scan of a subject, in accordance with aspects of the present disclosure.

FIG. 10 is a flowchart of a method 142 for utilizing a transfer function during a scan of a subject (e.g., patient). The method 142 may be performed by one or more components (e.g., processing circuitry) of the CT imaging system 10 in FIGS. 3 and 4.

Upon starting the method 142 (block 144), the method 142 includes obtaining (e.g., receiving) a scan protocol (e.g., calibration protocol and/or patient scanning protocol (i.e., diagnostic scan protocol)) for performing an X-ray scan (e.g., calibration scan and/or diagnostic scan) with the X-ray imaging system (e.g., CT imaging system) (block 146). The method 142 also includes parsing the scan protocol to determine the particular acquisition parameters for the X-ray scan (block 148).

The method 142 further includes determining a bending magnet current value to utilize to maintain (or to set) the X-ray focal spot position of an X-ray beam emitted from an X-ray tube of the X-ray imaging system at a desired location (e.g., center location of the X-ray detector) on an X-ray detector of the X-ray imaging system based on the acquisition parameters of the X-ray scan (as obtained from the scan protocol) (block 150). In particular, determining the bending magnet current value includes accessing a functional map (e.g., from a plurality of functional maps) based the acquisition parameters and then determining the bending magnet current value from the functional map.

The method 142 event further includes utilizing or using the determined bending current value during the X-ray scan (e.g., calibration scan and/or diagnostic scan) to maintain the X-ray focal spot position (or cause the X-ray focal spot position to be located) at the desired location on the X-ray detector (block 152). After the X-ray scan, the method 142 ends (block 154).

Figure 11:
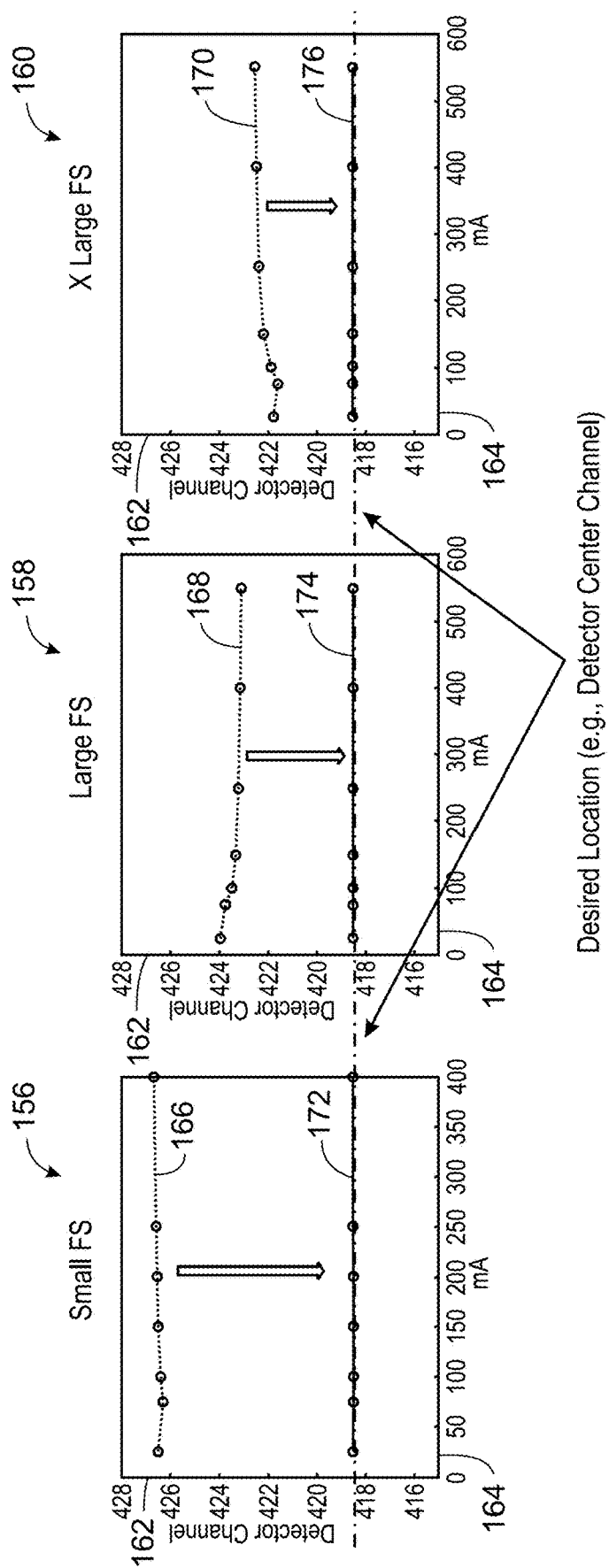
FIG. 11 is a schematic diagram illustrating the application of an in-built alignment mechanism for X-ray focal spot with respect to X-ray focal spot variability due to different focal spot sizes, in accordance with aspects of the present disclosure.

FIG. 11 is a schematic diagram illustrating the application of an in-built alignment mechanism for X-ray focal spot with respect to X-ray focal spot variability due to different focal spot sizes. FIG. 11 includes three graphs 156, 158, and 160 depicting X-ray focal spot location relative to X-ray tube current for different focal spot sizes (i.e., of electron beam impacting anode of X-ray tube). Graph 160 is derived from data utilizing an extra-large focal spot size (which is larger than the focal spot sizes utilized in graphs 156 and 158). Graph 158 is derived from data utilizing a large focal spot size (that is smaller than the focal spot size utilized in the graph 160). Graph 156 is derived from data utilizing a smaller focal spot size (that is smaller than the focal spots sizes utilized in both of the graphs 158 and 160). Each graph 156, 158, and 160 includes a Y-axis 162 representing a detector channel location of an X-ray detector and an X-axis 164 representing an X-ray tube current (mA). Plots 166, 168, and 170 represent X-ray focal spot locations or positions relative to X-ray tube currents derived from data gathered during scans in the absence of utilizing an in-built alignment mechanism for X-ray focal spot (as described above) for the graphs 156, 158, and 160, respectively. Plots 172, 174, and 176 represent X-ray focal spot locations or positions relative to X-ray tube currents derived from data gathered during scans in the presence of utilizing an in-built alignment mechanism for X-ray focal spot (as described above) for the graphs 156, 158, and 160, respectively. Dashed line 178 represents a desired X-ray focal spot location (e.g., detector center channel of the X-ray detector). As depicted, the in-built alignment mechanism enforces a desired X-ray focal spot location across both different focal spot sizes and different X-ray tube currents. The in-built alignment mechanism also enforces the desired X-ray focal spot location across different values of other acquisition parameters or system operation conditions.

Figure 12:
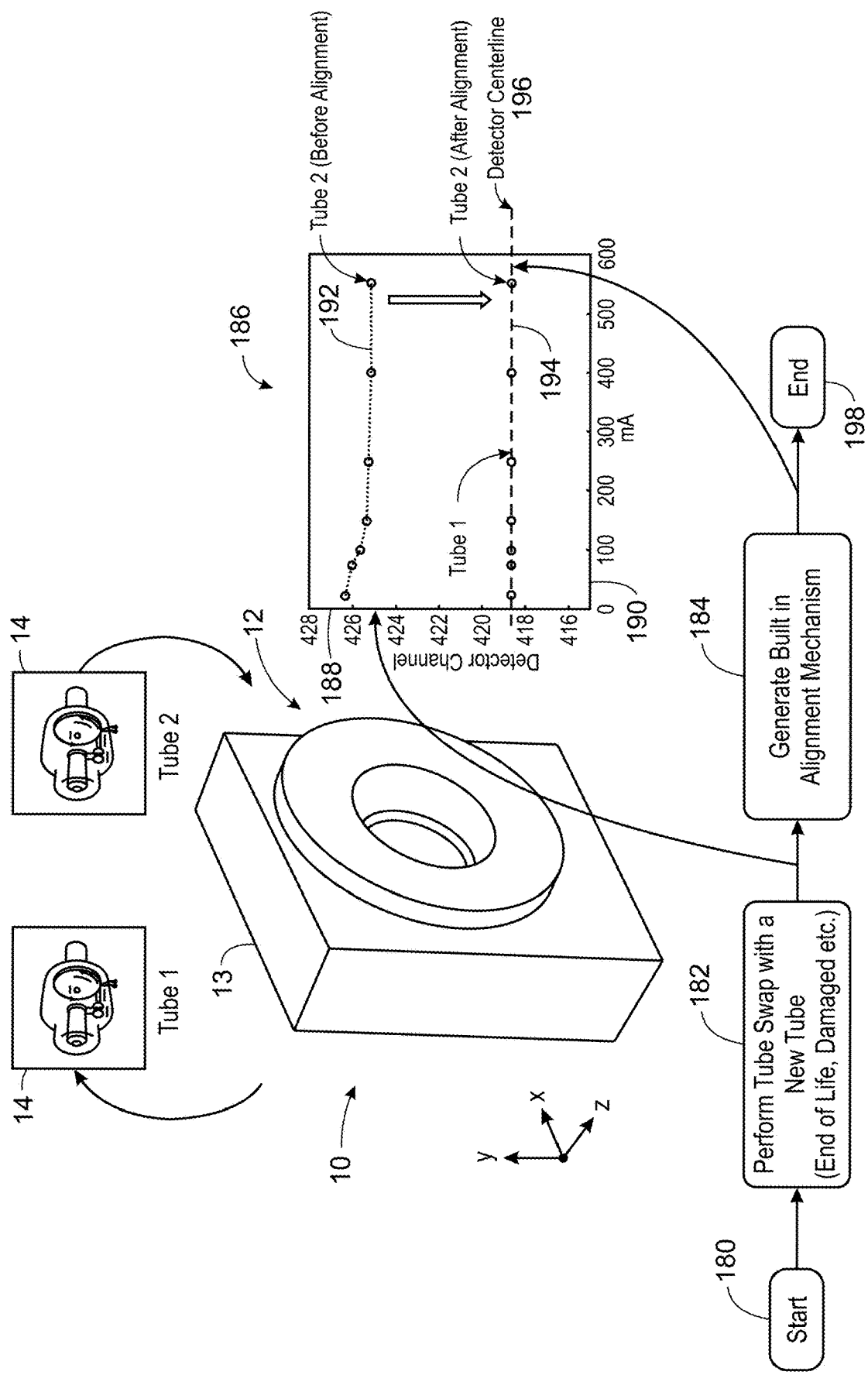
FIG. 12 is a schematic diagram illustrating a process flow of steps in response to a hardware change (e.g., X-ray tube swap) in a CT imaging system, in accordance with aspects of the present disclosure.

FIG. 12 is a schematic diagram illustrating a process flow of steps in response to a hardware change (e.g., X-ray tube swap) in the CT imaging system 10. Only a portion of the CT imaging system is shown. The process flow starts at step 180. The process flow includes performing an X-ray tube swap at step 182, where an old X-ray tube 14 (i.e., tube 1) is replaced with a new X-ray tube 14 (i.e., tube 2). The old X-ray tube 14 may be replaced due to reaching its end of life, becoming damaged, or another reason.

At step 184, a built-in alignment mechanism for X-ray focal spot is generated. In particular, air scan data and edge scan data are obtained utilizing an initial bending magnet current value and initial acquisition parameters during an initial scan with the X-ray imaging system. Then, an initial X-ray focal spot position is determined based on the air scan data and the edge scan data. This is followed by obtaining additional air scan data and additional edge scan data at different bending magnet current values utilized with the same initial acquisition parameters during subsequent scans with the X-ray imaging system and determining different focal spot positions based on the additional air scan data and the additional edge scan data. A functional map or functional look-up table is generated from these calculations that correlates bending magnet current value and X-ray focal spot position. The functional map includes a plurality of bending currents to be utilized for a set of acquisition parameters utilized with the X-ray imaging system to achieve the desired location for an X-ray focal spot. This process may be repeated a number of times where at least one of the acquisition parameters is different to generate further functional maps or functional look-up tables.

The functional map (or maps) including the bending magnet current values are saved for utilization with a subsequent scan. For example, a bending current magnet from a functional map (based on the acquisition parameters for the calibration scan) may be utilized in a performing a scan so that the X-ray focal spot is at a desired location on the X-ray detector (e.g., center location of the X-ray detector). This is illustrated in graph 186 of FIG. 12. Graph 186 depicts X-ray focal spot location relative to X-ray tube current. The graph 186 includes a Y-axis 188 representing a detector channel location of an X-ray detector and an X-axis 190 representing an X-ray tube current (mA). Plot 192 represents X-ray focal spot locations or positions relative to X-ray tube currents derived from data gathered during scans prior to generating the in-built alignment mechanism (but after the X-ray tube swap). Plot 194 represents X-ray focal spot locations or positions relative to X-ray tube currents derived from data gathered during scans in the presence of utilizing an in-built alignment mechanism for X-ray focal spot location (for both the old and new X-ray tubes 14). Dashed line 196 represents a desired X-ray focal spot location (e.g., detector center channel of the X-ray detector). As depicted, the in-built alignment mechanism enforces a desired X-ray focal spot location for the new X-ray tube 14 across different X-ray tube currents (which is the same for that used with the old X-ray tube 14). The in-built alignment mechanism also enforces the desired X-ray focal spot location across different values of other acquisition parameters or system operation conditions. The process flow ends at step 198.

Figure 13:
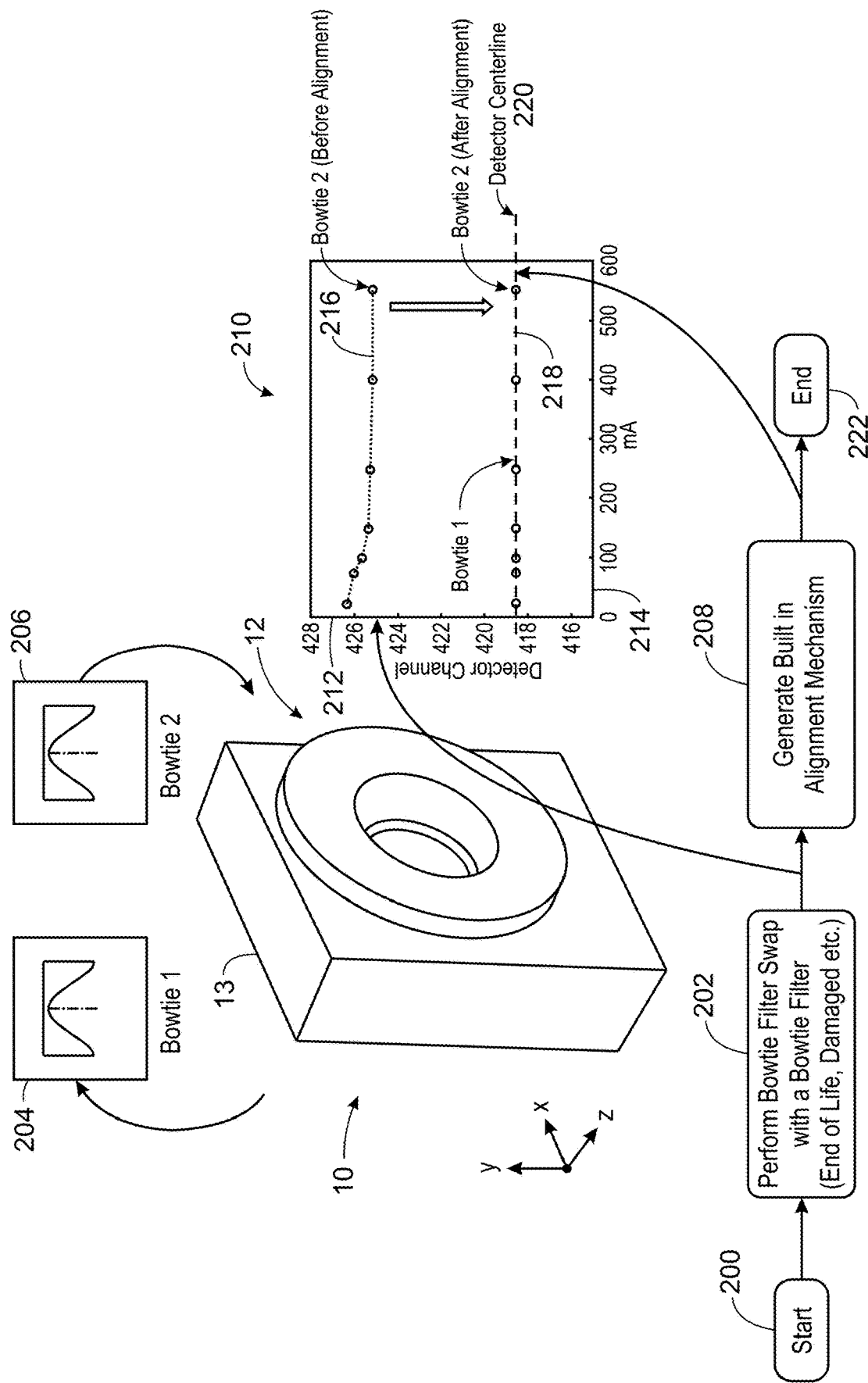
FIG. 13 is a schematic diagram illustrating a process flow of steps in response to a hardware change (e.g., bowtie filter swap) in a CT imaging system, in accordance with aspects of the present disclosure.

FIG. 13 is a schematic diagram illustrating a process flow of steps in response to a hardware change (e.g., bowtie filter swap) in the CT imaging system 10. Only a portion of the CT imaging system is shown. The process flow starts at step 200. The process flow includes performing a bowtie filter swap at step 202, where an old bowtie filter 204 (i.e., bowtie 1) is replaced with a new bowtie filter 206 (i.e., bowtie 2). The old bowtie filter 204 may be replaced due to reaching its end of life, becoming damaged, or another reason.

At step 208, a built-in alignment mechanism for X-ray focal spot is generated. In particular, air scan data and edge scan data are obtained utilizing an initial bending magnet current value and initial acquisition parameters during an initial scan with the X-ray imaging system. Then, an initial X-ray focal spot position is determined based on the air scan data and the edge scan data. This is followed by obtaining additional air scan data and additional edge scan data at different bending magnet current values utilized with the same initial acquisition parameters during subsequent scans with the X-ray imaging system and determining different focal spot positions based on the additional air scan data and the additional edge scan data. A functional map or functional look-up table is generated from these calculations that correlates bending magnet current value and X-ray focal spot position. The functional map includes a plurality of bending currents to be utilized for a set of acquisition parameters utilized with the X-ray imaging system to achieve the desired location for an X-ray focal spot. This process may be repeated a number of times where at least one of the acquisition parameters is different to generate further functional maps or functional look-up tables.

The functional map (or maps) including the bending magnet current values are saved for utilization with a subsequent scan. For example, a bending current magnet from a functional map (based on the acquisition parameters for the calibration scan) may be utilized in a performing a scan so that the X-ray focal spot is at a desired location on the X-ray detector (e.g., center location of the X-ray detector). This is illustrated in graph 210 of FIG. 13. Graph 210 depicts X-ray focal spot location relative to X-ray tube current. The graph 210 includes a Y-axis 212 representing a detector channel location of an X-ray detector and an X-axis 214 representing an X-ray tube current (mA). Plot 216 represents X-ray focal spot locations or positions relative to X-ray tube currents derived from data gathered during scans prior to generating the in-built alignment mechanism (but after the bowtie filter swap). Plot 218 represents X-ray focal spot locations or positions relative to X-ray tube currents derived from data gathered during scans in the presence of utilizing an in-built alignment mechanism for X-ray focal spot location (for both the old and new X-ray bowtie filters 204, 206). Dashed line 220 represents a desired X-ray focal spot location (e.g., detector center channel of the X-ray detector). As depicted, the in-built alignment mechanism enforces a desired X-ray focal spot location for the new bowtie filter 206 across different X-ray tube currents (which is the same as for that used with the old bowtie filter 204). The in-built alignment mechanism also enforces the desired X-ray focal spot location across different values of other acquisition parameters or system operation conditions. The process flow ends at step 198.

Technical effects of the disclosed embodiments include providing systems and methods for maintaining an X-ray focal spot position at a desired location (e.g., center detector channel location) on an X-ray detector of an X-ray imaging system (e.g., CT imaging system) over different system operating conditions via an in-built alignment mechanism for X-ray focal spot. Technical effects of the disclosed embodiments also include improving both calibration robustness and image quality (e.g., by mitigating artifacts caused by X-ray focal spot position drift) due to decoupling tube current (mA) dependency from X-ray focal spot position. Technical effects of the disclosed embodiments further include improving serviceability by ensuring a desired X-ray focal spot location over a detector after a hardware swap (e.g., of an X-ray tube or bowtie filter), thus, minimizing system downtime (e.g., by reducing calibration time). Technical effects of the disclosed embodiments yet further include improving dose delivery predictability by enforcing the assumption related to X-ray focal spot position (as a precise X-ray focal spot location over a detector is required to calculate and estimate the accurate dose for a patient). Technical effects of the disclosed embodiments still further include providing a holistic approach combing system hardware along with software for computation and analysis to align X-ray focal position to a desired location of a detector (i.e., keeps the X-ray focal spot position consistent at a desired location on the detector across all acquisition parameters).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for maintaining an X-ray focal spot position at a desired location on an X-ray detector of an X-ray imaging system, comprising:
   obtaining, via processing circuitry, a scan protocol for performing an X-ray scan with the X-ray imaging system;
   generating, via the processing circuitry, a functional map prior to the X-ray scan by:
      obtaining air scan data and edge scan data utilizing an initial bending magnet current value and initial acquisition parameters during an initial scan with the X-ray imaging system;
      determining an initial X-ray focal spot position based on the air scan data and the edge scan data;
      obtaining additional air scan data and additional edge scan data at different bending magnet current values utilized with the initial acquisition parameters during subsequent scans with the X-ray imaging system; and determining different X-ray focal spot positions based on the additional air scan data and the additional edge scan data;

accessing, via the processing circuitry, the functional map prior to the X-ray scan, wherein the functional map comprises a plurality of bending magnet current values and corresponding X-ray focal spot positions to be utilized for a plurality of acquisition parameters;

determining, via the processing circuitry, a bending magnet current value to utilize to maintain the X-ray focal spot position of an X-ray beam emitted from an X-ray tube of the X-ray imaging system at the desired location on the X-ray detector based on the plurality of acquisition parameters of the X-ray scan, wherein determining the bending magnet current value to utilize to maintain the X-ray focal spot position comprises determining the bending magnet current value from the functional map based on the plurality of acquisition parameters of the X-ray scan to achieve the desired location for an X-ray focal spot; and utilizing, via the processing circuitry, the bending magnet current value during the X-ray scan to maintain the X-ray focal spot position at the desired location on the X-ray detector.

2. The method of claim 1, wherein utilizing the bending magnet current value during the X-ray scan comprises applying a bending magnet current corresponding to the bending magnet current value on electromagnets to utilize electromagnetic deflection on an electron beam emitted from a cathode of the X-ray tube to maintain the X-ray focal spot position of the X-ray beam emitted from the X-ray tube.

3. The method of claim 1, further comprising storing, via the processing circuitry, the functional map locally with the X-ray imaging system for utilization with the X-ray tube.

4. The method of claim 1, further comprising updating, via the processing circuitry, the functional map in response to replacing the X-ray tube with a different X-ray tube or in response to replacing a bowtie filter with a different bowtie filter.

5. The method of claim 1, wherein the scan protocol comprises a calibration scan protocol and the X-ray scan comprises a calibration scan.

6. The method of claim 1, wherein the scan protocol comprises a diagnostic scan protocol and the X-ray scan comprises a diagnostic scan.

7. The method of claim 1, wherein the X-ray imaging system comprises a computed tomography imaging system.

8. The method of claim 1, wherein the plurality of acquisition parameters comprises three or more of a tube current, a tube voltage, a focal spot size, a bowtie filter, a rotation speed, a gantry angle, a thermal state, and a time of day.

9. A system for maintaining an X-ray focal spot position at a desired location on an X-ray detector of an X-ray imaging system, comprising:

a memory encoding processor-executable routines; and
processing circuitry configured to access the memory and to execute the processor-executable routines, wherein the routines, when executed by the processing circuitry, cause the processing circuitry to:
obtain a scan protocol for performing an X-ray scan with the X-ray imaging system;
generate a functional map prior to the X-ray scan by:
obtaining air scan data and edge scan data utilizing an initial bending magnet current value and initial acquisition parameters during an initial scan with the X-ray imaging system;
determining an initial X-ray focal spot position based on the air scan data and the edge scan data;
obtaining additional air scan data and additional edge scan data at different bending magnet current values utilized with the initial acquisition parameters during subsequent scans with the X-ray imaging system; and
determining different X-ray focal spot positions based on the additional air scan data and the additional edge scan data;
access the functional map prior to the X-ray scan, wherein the functional map comprises a plurality of bending magnet current values and corresponding X-ray focal spot positions to be utilized for a plurality of acquisition parameters;
determine a bending magnet current value to utilize to maintain the X-ray focal spot position of an X-ray beam emitted from an X-ray tube of the X-ray imaging system at the desired location on the X-ray detector based on a plurality of acquisition parameters of the X-ray scan, wherein determining the bending magnet current value to utilize to maintain the X-ray focal spot position comprises determining the bending magnet current value from the functional map based on the plurality of acquisition parameters of the X-ray scan to achieve the desired location for an X-ray focal spot; and
utilize the bending magnet current value during the X-ray scan to maintain the X-ray focal spot position at the desired location on the X-ray detector.

10. The system of claim 9, wherein utilizing the bending magnet current value during the X-ray scan comprises applying a bending magnet current corresponding to the bending magnet current value on electromagnets to utilize electromagnetic deflection on an electron beam emitted from a cathode of the X-ray tube to maintain the X-ray focal spot position of the X-ray beam emitted from the X-ray tube.

11. The system of claim 9, wherein the routines, when executed by the processing circuitry, cause the processing circuitry to further store the functional map locally with the X-ray imaging system for utilization with the X-ray tube.

12. A non-transitory computer-readable medium, the computer-readable medium comprising processor-executable code that when executed by processing circuitry, causes the processing circuitry to:

obtain a scan protocol for performing a scan with a computed tomography (CT) imaging system;
generate a functional map prior to the scan by:
obtaining air scan data and edge scan data utilizing an initial bending magnet current value and initial acquisition parameters during an initial scan with the CT imaging system;
determining an initial X-ray focal spot position based on the air scan data and the edge scan data;
obtaining additional air scan data and additional edge scan data at different bending magnet current values utilized with the initial acquisition parameters during subsequent scans with the CT imaging system; and
determining different X-ray focal spot positions based on the additional air scan data and the additional edge scan data;
access the functional map prior to the scan;

determine from the functional map a bending magnet current value to utilize to maintain an X-ray focal spot position of an X-ray beam emitted from an X-ray tube of the CT imaging system at a desired location on an X-ray detector of the CT imaging system based on a plurality of acquisition parameters of the scan, wherein the functional map comprises a plurality of bending magnet current values and corresponding X-ray focal spot positions to be utilized for the plurality of acquisition parameters; and utilize the bending magnet current value during the scan to maintain the X-ray focal spot position at the desired location on the X-ray detector.

\* \* \* \* \*